(12) United States Patent
Dings

(10) Patent No.: US 6,934,725 B1
(45) Date of Patent: Aug. 23, 2005

(54) MANAGEMENT OF FILE EXTENT MAPPING TO HASTEN MIRROR BREAKING IN FILE LEVEL MIRRORED BACKUPS

(75) Inventor: Thomas L Dings, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 573 days.

(21) Appl. No.: 10/029,344

(22) Filed: Dec. 28, 2001

(51) Int. Cl.[7] .............................................. G06F 17/30
(52) U.S. Cl. ...................................... 707/204; 711/162
(58) Field of Search ............................... 707/202–204; 711/162

(56) References Cited

U.S. PATENT DOCUMENTS

| | | | | |
|---|---|---|---|---|
| 5,212,784 A | * | 5/1993 | Sparks | 714/6 |
| 6,161,111 A | | 12/2000 | Mutalik et al. | 707/205 |
| 6,269,381 B1 | * | 7/2001 | St. Pierre et al. | 707/202 |
| 6,304,980 B1 | * | 10/2001 | Beardsley et al. | 714/6 |
| 6,397,307 B2 | * | 5/2002 | Ohran | 711/161 |
| 6,611,850 B1 | * | 8/2003 | Shen | 707/204 |
| 6,611,923 B1 | * | 8/2003 | Mutalik et al. | 714/4 |
| 6,714,980 B1 | * | 3/2004 | Markson et al. | 709/226 |

OTHER PUBLICATIONS

Dill: "EMC Best Practices: Symmetrix Connect and File Level Granularity"; EMC Corporation; BP-00008, Feb. 27, 2001; pp. 1-31.

* cited by examiner

*Primary Examiner*—Leslie Wong
(74) *Attorney, Agent, or Firm*—Daly, Crowley, Mofford & Durkee, LLP

(57) ABSTRACT

An enterprise storage system for performing a file level backup operation on data using a mirror disk and a primary disk includes a split mechanism to split the mirror disk from the primary disk before backing data files up from said mirror disk to said sequential storage media and an extent mapping mechanism to perform extent mapping on files to be backed up in a given backup session before the split mechanism splits the mirror for the same given backup session, and an extent map check and update mechanism to check, after the split mechanism splits the mirror for the same given backup session, whether any files have been updated in a manner so as to require additional or revised extent map information.

11 Claims, 8 Drawing Sheets

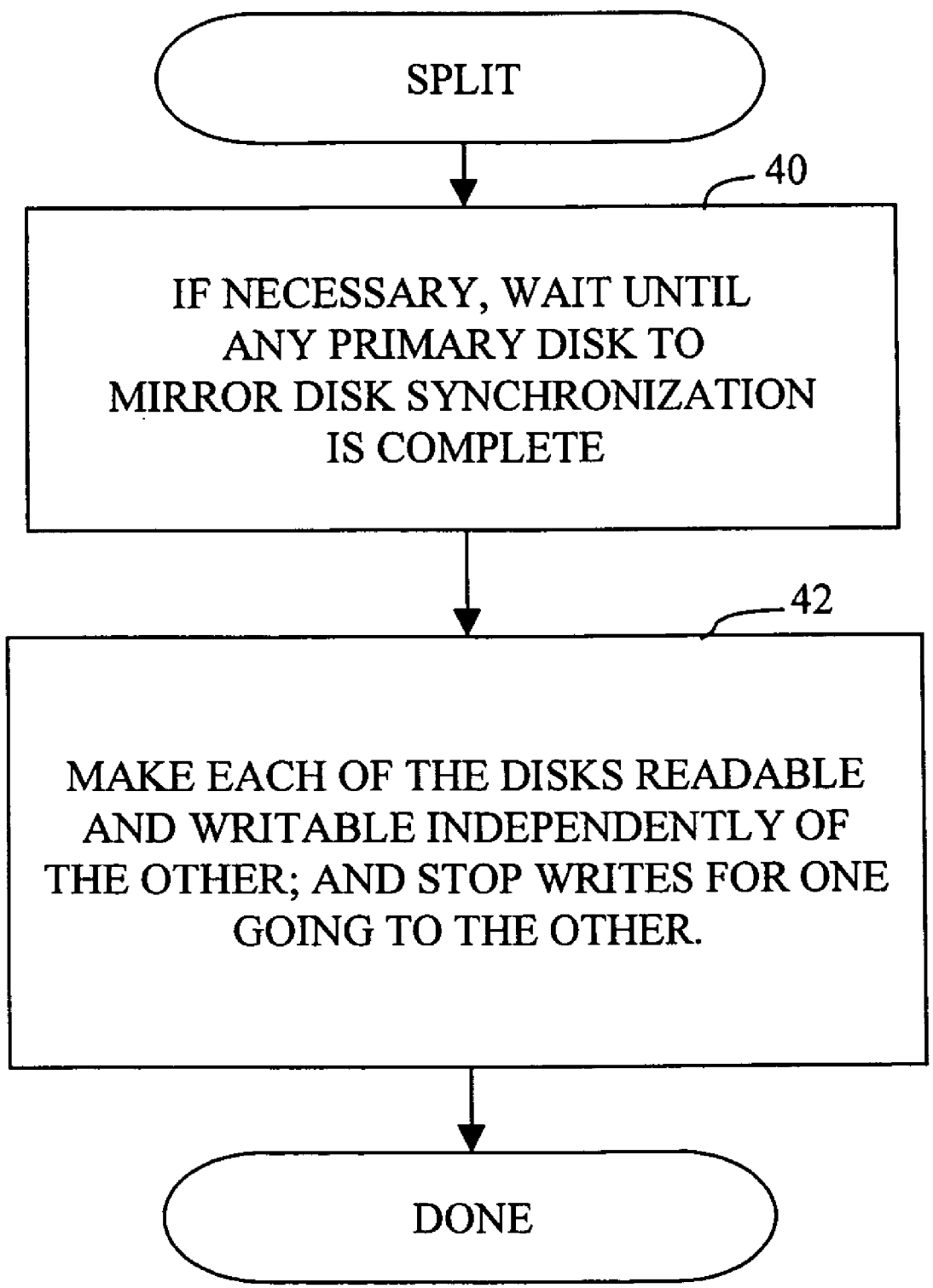

MANAGEMENT OF FILE EXTENT MAPPING TO HASTEN MIRROR BREAKING IN FILE LEVEL MIRRORED BACKUPS

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

The present invention, in certain respects, relates to enterprise storage systems and backup and recovery processes. In other respects, the present invention relates to performing a split or break of a mirror disk from a primary disk in preparation for a file level backup of files from the mirror disk to a secondary long-term storage device, such as a tape backup device.

3. Description of Background Information

Enterprise storage systems store data for enterprise level applications, and thus play a critical role in many business environments. A company may use an enterprise storage system to migrate its disparate and separately located data centers to a new central location. In addition, an enterprise storage system can form a key part of an infrastructure that allows an internet service provider (ISP) to store, manage, and deliver rich media content, that gives the ISP backup and restore capabilities essential for site failures or disasters, and that allows the ISP to streamline its management of hardware and software platforms and applications.

In such business environments, and in many others, the data used is mission-critical. Enterprise storage systems provide enterprise level systems with fast (low latency) read and write access to media (typically magnetic disks) suitable for storing such mission critical data, and meanwhile protect the data and make it continuously available even when a primary disk holding the data fails. To help with such protection and continuous availability, enterprise storage systems are typically provided with mirror disks (or volumes) that provide redundancy for a primary disk (or volume). Such a mirror may be implemented in the form of a standard RAID mirror. An additional mirror may be provided for additional data protection, or may be provided instead of a standard RAID mirror. An EMC Symmetrix™ storage unit may serve as an enterprise storage system, comprising a primary disk and a mirror disk; in this context, the mirror disk is referred to as business continuance volume (BCV). The enterprise storage system may comprise two Symmetrix storage units, including a first Symmetrix storage unit (having a primary disk) connected to a second Symmetrix storage unit (having a mirror) by a high speed data link; here, the mirror is referred to as a Symmetrix Remote Data Facility (SRDF)™ volume. A volume is a storage entity that might correspond to a portion of a hard disk or a group of hard disks within a given enterprise storage platform.

Enterprise storage systems such as those described above perform data backup processes and restore processes. Disk level backups and restores involve the backing up or the restoring of a raw "image" of the entire disk, while file-level backups and restores require file mapping, a process by which each file to be backed up, that may be located at various physical locations on a disk (or separate disks) is mapped (i.e., tracked using meta data) when it is sent to the backup storage devices.

Mirrors may serve different purposes. For example, a mirror may provide redundancy for a primary disk, when there are problems with the primary disk, in which case the host can be given direct access to uncorrupted data on the mirror. Mirrors also facilitate mirrored restore and mirrored backup operations. Data may be restored, for example, from a backup storage device with or without mirroring. With a mirrored restore, data is typically first read from the backup storage device and stored onto a mirror disk, and later moved from the mirror disk to the primary disk for use by the host system. With a mirrored backup, data on the primary disk is first synchronized onto the mirror, and later moved from the mirror to the backup storage devices.

When performing operations involving a mirror disk, it is frequently necessary to perform certain actions on the mirror. For example, a mirror may be established, split, or synchronized in either direction (including a synchronization from the mirror to the disk, and a synchronization from the disk to the mirror). When a mirror is established, changes in the data content of a primary disk are also applied to the data content on the mirror disk, thereby maintaining a "mirror image" of the primary disk on the mirror disk. When a mirror disk is split, changes in the data content of the primary disk are no longer applied to the data content of the mirror disk.

An example mirror split process is shown in FIG. 2. Before the mirror disk is split, as shown in act 40, it may be updated, when necessary, to represent the data content of the primary disk at a time just prior to the split, and in act 42 the mirror disk is then split, i.e., logically detached from the primary disk and made addressable to the host system. A BCV mirror of a Symmetrix storage unit, when it is split, is assigned to an original device address used by the host system.

When a mirror is synchronized, synchronizing data from the primary disk to the mirror, all of the changes that have occurred to the data on the primary disk are applied to the mirror disk, in order to bring the mirror disk current with the primary disk. Similarly, in the opposite direction, when synchronizing data from the mirror disk to the primary disk, changes to data on the mirror disk are applied to the primary disk so that the primary disk matches the mirror disk. This mirror disk to primary disk synchronization is often one of the final steps that occurs during a mirrored restore operation, where data is restored from the backup storage devices to the primary disk.

Mirror splits are performed whenever there is a need to make either the mirror disk or the primary disk accessible to another entity independent of the other of the two disks. The sooner the split can be finished, the sooner both disks are independently accessible. For example, when a file level mirrored backup occurs, data is synchronized from the primary disk to mirror disk while the application in the host is quiesced (e.g., frozen or placed in a hot backup state) (this is referred to as a database outage). Individual files to be backed up are then copied from the mirror disk to the backup storage device while, after a database quiesce period, a database application on a host system can freely read from and write to a database stored on the primary disk.

FIG. 4 provides waveforms depicting the timing of certain operations pertinent to a file level mirrored backup. Waveforms (a) and (b) correspond to a background file level mirrored backup operation. Waveform (a) depicts the timing of quiesce 400 and backup 402 operations, and waveform (b) depicts the timing of extent mapping 406 and of a database outage 406. In such a background system, data is backed up for a period of time 402, after the database is quiesced 400. During the backup, data is moved (or copied) from the mirror disk to the backup storage devices; as the data is moved from the mirror disk to the backup storage devices, a database outage 404 may last too long.

A database outage with such a background approach can last, for example, up to six minutes. In certain business environments, this can present a significant inconvenience to users of a given computer system. For example, if a Microsoft Exchange Server is being backed-up, this can prevent users from using Microsoft Outlook during a substantial portion of the backup process.

SUMMARY OF THE INVENTION

The present invention is presented to serve one or more of the objects and advantages as set forth herein. In certain respects, the present invention is provided to improve upon file level disk backup processes. In other respects, the present invention is provided to reduce database outage times when performing file level disk backup operations.

In accordance with one aspect of the invention, an enterprise storage system is provided. Alternatively, the invention may be directed to a method, or any part or portion of the system or method. The invention may also be embodied in the form of computer-readable media encoded to perform all or any subset of the functions of such a system or method.

The system performs a file level backup operation on data using a mirror disk and a primary disk. Individual files of the backed up data are backed up from the mirror disk to a backup storage device while, after a database quiesce period, a database application on a host system can freely read from and write to a database stored on the primary disk. The database quiesce period occurs as part of the file level backup operation. The system has a primary disk and a mirror disk. A file level mirrored backup portion is provided, which is operable to initiate a file by file backup of data from the mirror disk to sequential storage media. A synchronizer synchronizes data from the primary disk to the mirrored disk upon an intitiation of a file level mirrored backup process by the file level mirrored backup portion. A database quiesce mechanism is operable, after the synchronizer synchronizes the data from the primary disk to the mirror disk, to quiesce read and write interactions between the database application and the primary disk. A discovery and prepare mechanism is operable after the quiescing of the read and write interactions to conduct discovery and prepare phases of a file by file mirrored backup operation.

A backup and cleanup mechanism backs up certain identified files from the mirror disk to the sequential storage media after completion of the discovery and prepare phases. A split mechanism is operable to split the mirror disk from the primary disk before backing data files up from the mirror disk to the sequential storage media. An extent mapping mechanism performs extent mapping on files to be backed up in a given backup session before the split mechanism splits the mirror for the same given backup session. The extent mapping may be done earlier—before the database quiesce mechanism quiesces the read and write interactions for the same given backup session, in one embodiment.

As noted above, mirror splits are performed whenever there is a need to make either the mirror disk or the primary disk accessible to another entity independent of the other of the two disks. The sooner the split can be finished, the sooner both disks are independently accessible. Another aspect of the invention may be directed to decreasing the wait time for a mirror split (i.e., moving the split up in time) in a given enterprise storage process or system. This more quickly makes either the mirror disk or the primary disk accessible to another entity independent of the other of the two disks. This may be done by performing one or more time-consuming pre-split acts (i.e., an act that should be done before a split; e.g., a synchronization or a quiescing of the database) at an earlier time in the process (e.g., a mirrored backup or restore process), while checking the storage system at a later time yet still prior to the split and performing update acts to complete the pre-split acts (e.g., if files have been updated since the last time an extent mapping was performed, then perform extent mapping for such files).

BRIEF DESCRIPTION OF THE DRAWINGS

Non-limiting embodiments of the present invention are described in the detailed description below, by reference to the noted drawings, in which the like reference numerals represent similar parts throughout the several views of the drawings, and wherein:

FIG. 2 is a flow chart of a background art split process, where a mirror disk is split from a primary disk;

DETAILED DESCRIPTION

Figure 1A:
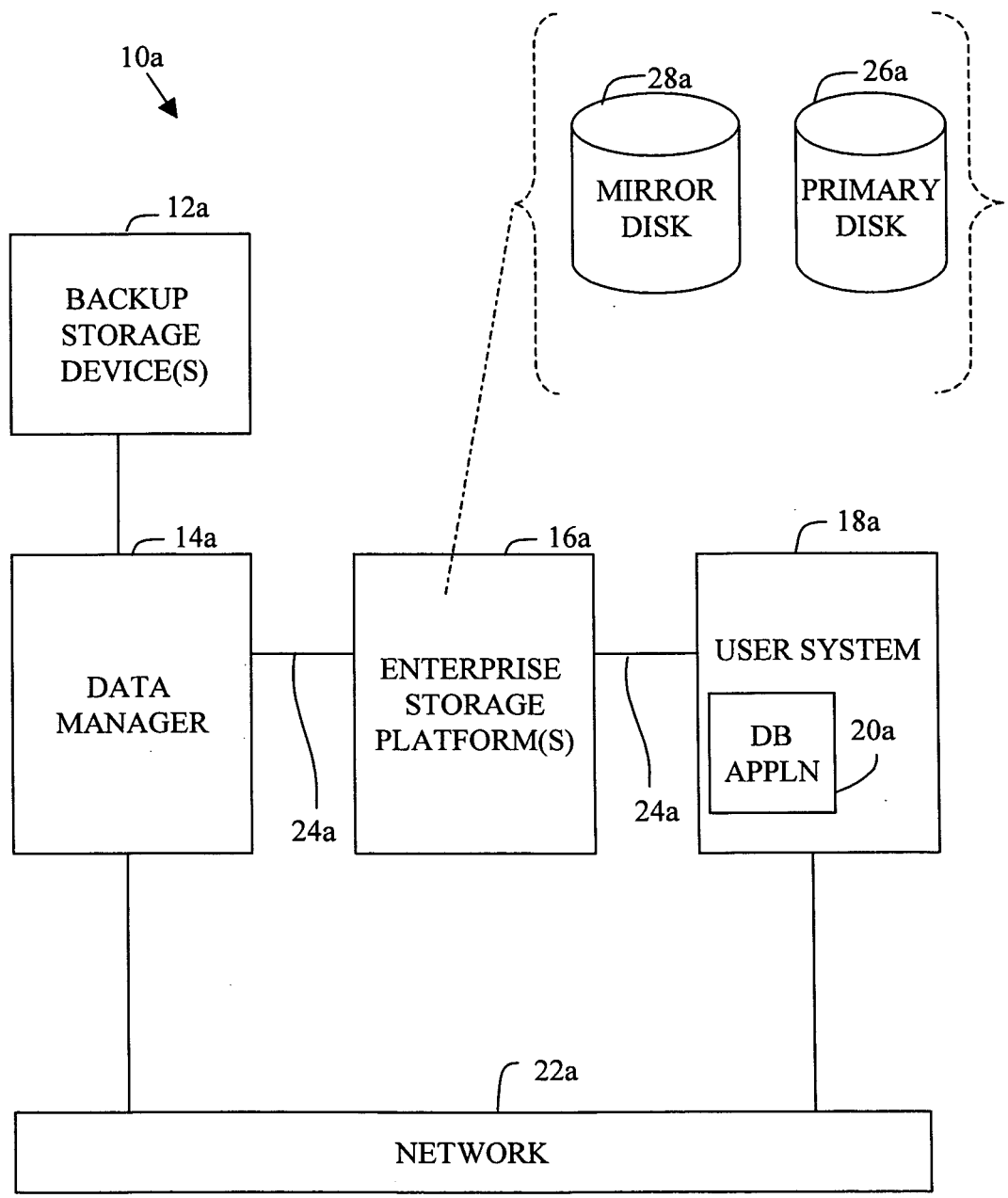
FIGS. 1A and 1B are simplified high-level block diagrams of illustrated embodiments of an enterprise storage system capable of performing backups and restores.

Referring now to the drawings in more detail, FIG. 1A illustrates one embodiment of an enterprise storage system 10a involved in backing up data from a primary disk 26a to one or more backup storage devices 12a. In the illustrated system, a backup storage device (or plural backup storage devices) 12a is connected to a data manager 14a. Data manager 14a is connected, in tandem, to an enterprise storage platform (or plural collocated or remote enterprise storage platforms) 16a and to a user system (a host system) 18a. In the illustrated system, each of data manager 14a and user system 18a is linked via a network 22a, and is connected directly to at least one local enterprise storage platform 16a via one or more channels (e.g., SCSI channels) 24a.

Figure 1B:
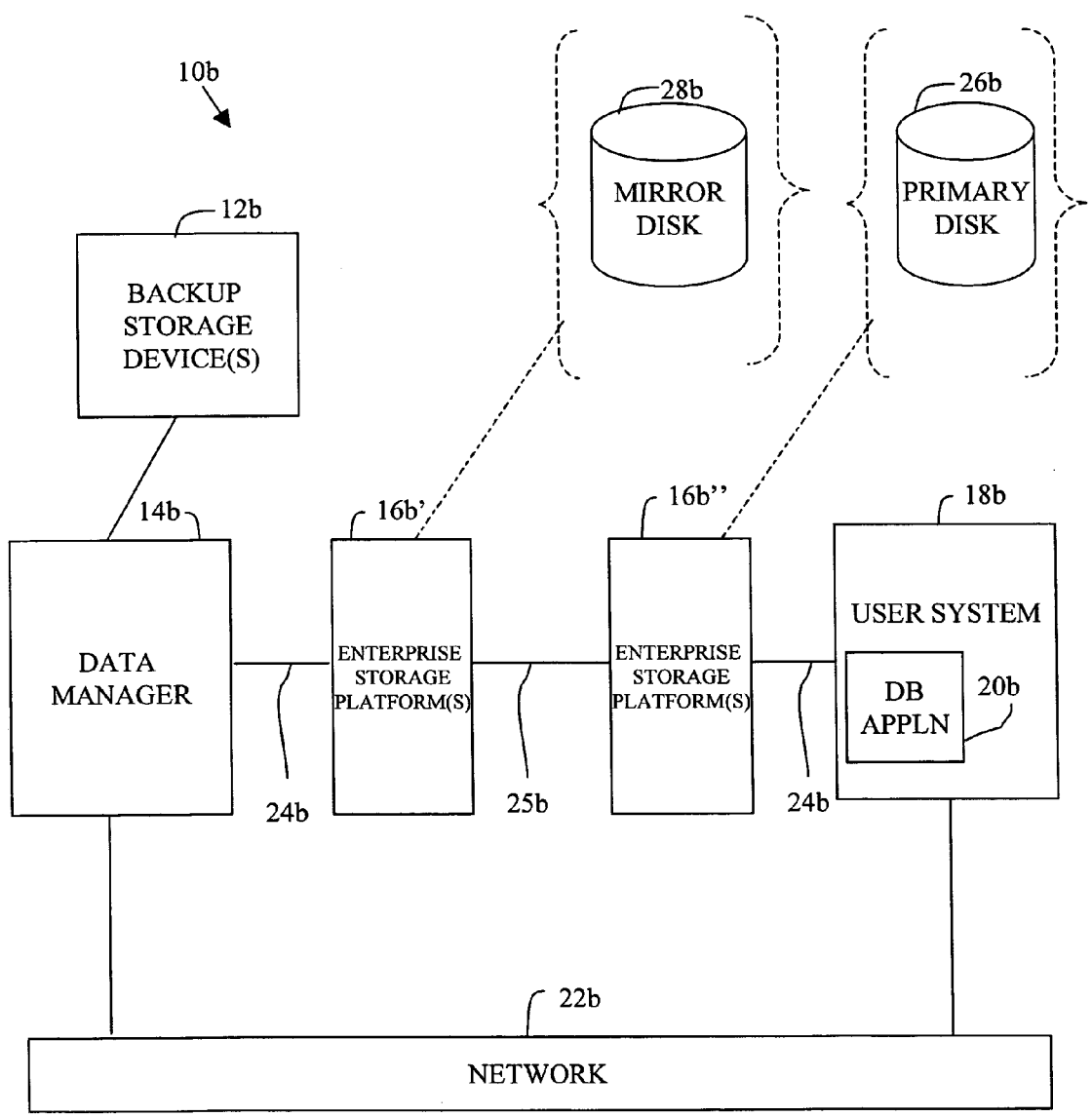

FIG. 1B illustrates another embodiment of an enterprise storage system 10b involved in backing up data from a primary disk 26b to one or more backup storage devices 12b. In the illustrated system, a backup storage device (or plural backup storage devices) 12b is connected to a data manager 14b. Data manager 14b is connected, in tandem, to enterprise storage platforms 16b', 16b'' and to a user system (a host system) 18b. In the illustrated system, each of data manager 14b and user system 18b is linked via a network 22b, and is connected directly to at least one local enterprise storage platform 16b', 16b" via one or more channels (e.g., SCSI channels) 24b. The illustrated enterprise storage platforms of FIG. 1B comprise one platform 16b' (on the left) that comprises mirror disk 28 and another platform 16b" (on the right) that comprises primary disk 26b. This pair of platforms 16b is connected by a high speed data link (e.g., a fiber optic link).

Backup storage device(s) 12a, 12b may comprise, e.g., a tape library unit. Data manager 14a, 14b may comprise, e.g., a Sun™ microstation running EDM™ software (EMC data manager software). Enterprise storage platform 16a, 16b may, e.g., comprise one or more plural local/collocated or remote Symmetrix™ integrated cached disk arrays™ (a remote disk array may be a Symmetrix Remote Data Facility (SRDF)). User system 18a, 18b may comprise a host computer or a host computer network, which includes a database application.

Database application 20a, 20b retrieves and stores, in real time, data from and to a primary disk 26a, 26b. The data on primary disk 26a, 26b may be mirrored by a mirror disk 28a, 28b. Mirror disk 28a, 28b may comprise one or a combination of a RAID type of mirror and a mirror—such as a Business Continuance Volume (BCV). In the illustrated embodiment, mirror disk 28 comprises a volume which may be protected via a RAID mirror.

In operation, a database application 20a, 20b in one or more user systems 18a, 18b accesses, processes, and stores data in or on enterprise storage platform 16a, 16b. User system 18a, 18b is interfaced to the enterprise storage platform, which is in turn coupled to a data manager, which controls, among other functions, backup operations where data on a primary disk 26a, 26b is backed up to one or more backup storage devices 12a, 12b. Generally, a data manager may be capable of performing several different types of backup operations, including, e.g., a device backup, a raw file system backup, and a file-level backup. If the backup is a mirrored backup, the data is copied from the mirror disk to the backup storage device, while the user system keeps access to the primary disk. If the backup is not a mirrored backup, the data is copied directly from the primary disk to the backup storage device.

Device backups involve backing up all data of a given device; e.g., the device may be defined as the primary disk, which is replicated in the mirror disk. A restore of a device backup must restore the entire device, since file-level information is not tracked during a device backup. Raw filesystem backups also involve backing up the entire device, and restores of such a backup require restoring of the entire device. However, a raw filesystem backup is different from a device backup in that a user can browse for a certain file using a restore GUI; with a device backup such browsing is not possible. File level backups backup files as files, i.e., with file level granularity.

Device level backups and raw filesystem backups are faster than file level backups, and thus can be easier on the user system and its database application, i.e., the require less processing involvement by the user system. In contrast, file level backups can require susbstantial participation by applications and operating systems on the user system, and thereby reduce the performance of the user system. When a file level backup is performed, the user system must keep track of components of data files typically scattered and stored in non-contiguous segments spanning different disks within the storage system.

During a file level mirrored backup operation, individual files of data to be backed up are backed up (copied) from the mirror disk to the backup storage device (typically a sequential storage device such a backup tape).

Figure 3:
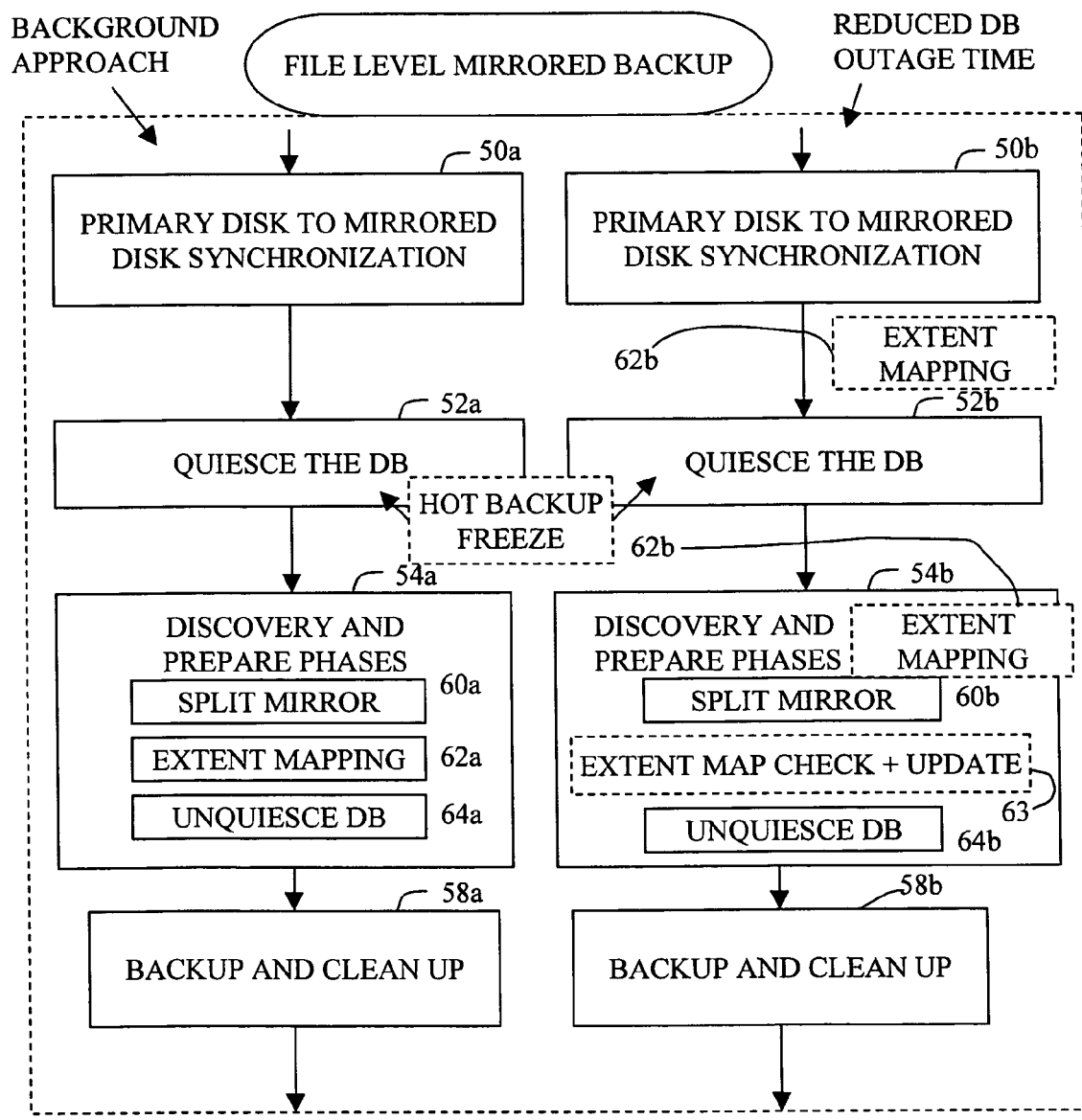
FIG. 3 is a comparative flow chart of a file level mirrored backup process; a background approach is shown on the left, and an embodiment of an improved approach is shown on the right.

FIG. 3 is a comparative flow chart of a file level mirrored backup process; a background approach is shown on the left, and an embodiment of an improved approach is shown on the right. In the background approach, in an initial act 50a, a synchronization is performed from the primary disk to the mirror disk. Then, in act 52a, the database is quiesced.

Quiescing of the database may entail freezing the ability for the database application in the user system to read or write any data to or from the primary disk to be backed up. This may be referred to as an off-line backup. Alternatively, quiescing of the database may involve a process that may be referred to as a hot backup or an on-line backup (this can be done, e.g., with an Oracle database).

With an on-line backup, writes intended for the primary disk are stored in a redo log (not shown) instead of storing them on the intended media. This prevents data from being written to the primary disk for a period of time, until the database is unquiesced.

In act 54a, discovery and prepare phases are executed. Such phases of a file level mirrored backup operation are know to the skilled artisan, although the present disclosure does not require any specific implementation or version of such phases, as long as the important functionality is carried out at the right times so as to facilitate the backup operation. For example, during the discovery phase, the data manager may ascertain, from the user system, the files to be backed up and other file-related information (e.g., time/date stamps of when the files were last changed). This phase may result in the production of a list of files or of logical devices. In addition, during the discovery phase, the data manager may obtain mapping information; at the user system level, each file (data unit) is associated with its location on the primary disk. This process is extent mapping, and may produce an ordered list of the disk extents that make up each file. For example, each data unit may be represented in terms of disk, block/extent offset, and extent length.

During the preparation phase, the database application and the host-resident file system prepare for the backup operation. This may include the data manager identifying the specific physical storage elements on the mirror disk to be backed up and determining the backup storage space that will be needed. This may be done by, among other acts, the data manager building a layered representation of the backup information.

More information regarding one example implementation of discovery and preparation phases is provided in U.S. Pat. No. 6,047,294, the content of which is hereby expressly incorporated by reference in its entirety. While such disclosure is incorporated by reference, its contents are to be treated as specific implementations limiting of the present invention in its broader aspects.

At some time during these phases, the mirror is split (at act 60a), extent mapping is performed (at act 62a—as noted above, extent mapping may be part of the discovery phases), and the database is unquiesced (at act 64a). In the illustrated embodiment, acts 60a, 62a, and 64a are executed in the order as presented. Similarly, for corresponding portions in the right part of FIG. 3, in the illustrated embodiment, acts 60b, 63, and 64b are executed in the order presented.

Backup and clean up processes are performed at act 58a.

As noted above, FIG. 4 provides waveforms depicting the timing of certain operations pertinent to a file level mirrored backup. Waveforms (a) and (b) correspond to a background file level mirrored backup operation. Waveform (a) depicts the timing of quiesce 400 and backup 402 operations, and waveform (b) depicts the timing of extent mapping 406 and of a database outage 406. In such a background system, data is backed up for a period of time 402, after the database is quiesced 400. During the backup, data is moved (or copied) from the mirror disk to the backup storage devices; as the data is moved from the mirror disk to the backup storage devices, a database outage 404 may last too long.

Accordingly, a reduced database outage time approach is depicted in the right-hand portion of the flow chart shown in FIG. 3.

In accordance with that approach, many of the same acts are performed as described above with respect to the background approach (in the left-hand portion of FIG. 3). That is, acts 50b, 52b, 54b, and 58b correspond substantially to acts 50a, 52a, 54a, and 58a as desribed above.

However, instead of performing all of the extent mapping after splitting the mirror at act 60a, an extent mapping act 62b is performed at an earlier point in time. Such extent mapping 62b may be performed as part of the discovery and prepare phases, yet before splitting the mirror at act 60b. Part of (or all of) such extent mapping 62b may be performed at any earlier point in the process. Alternatively, all of such extent mapping 62b may be performed just before quiescing the database at act 52b, as depicted by the upper of the two blocks 62b provided in FIG. 3.

In the process shown in the right hand portion of FIG. 3, an additional act 63 is provided, for performing an extent map check and update. This act is provided because it is possible that some files have been changed on the primary disk (e.g., written to by the user system) since the extent mapping act was performed (at 62b).

The extent mapping is time consuming, and moving this part of the process up in time decreases the time it takes to split or break the mirror (at act 60b), which allows the process to free up the database, i.e., unquiesce the database (at act 64b).

Figure 4:
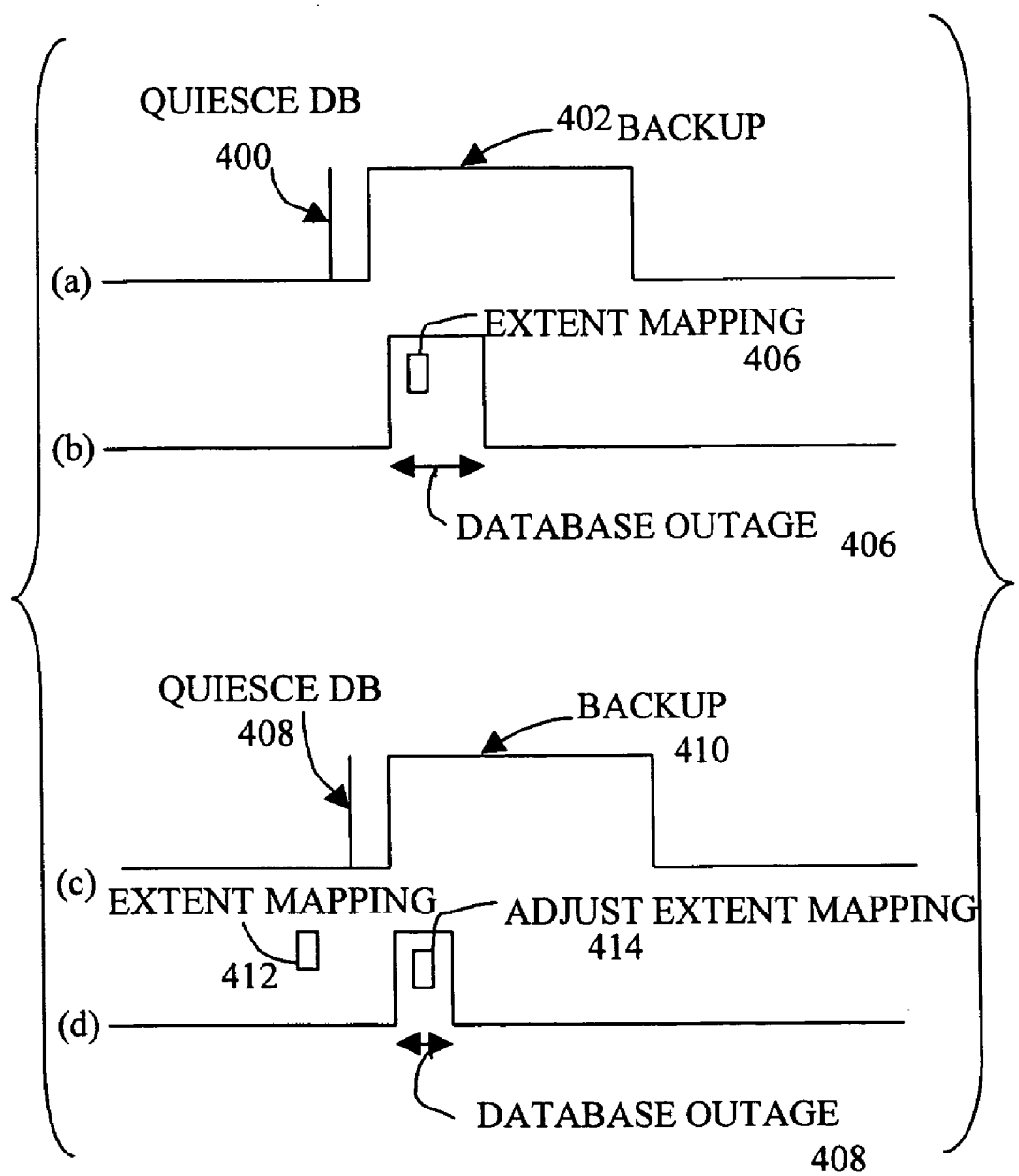
FIG. 4 is a comparative waveform diagram that illustrates the timing of various events in a mirrored file level backup operation; waveforms (a) and (b) correspond with the background approach, while waveforms (c) and (d) correspond with an embodiment of an improved approach.

FIG. 4 provides waveforms depicting the timing of certain operations pertinent to a file level mirrored backup. Waveforms (c) and (d) correspond to the improved approach shown in the right hand portion of FIG. 3. Waveform (c) depicts the timing of quiesce 408 and backup 410 operations, and waveform (d) depicts the timing of extent mapping 412 and of a (much shorter) database outage 408. In such an improved system, data is backed up for a period of time 410, after the database is quiesced 408. During the backup, data is moved (or copied) from the mirror disk to the backup storage devices; as the data is moved from the mirror disk to the backup storage devices, the database outage 408 is much shorter than the database outage 406 in waveform (b).

Figure 7:
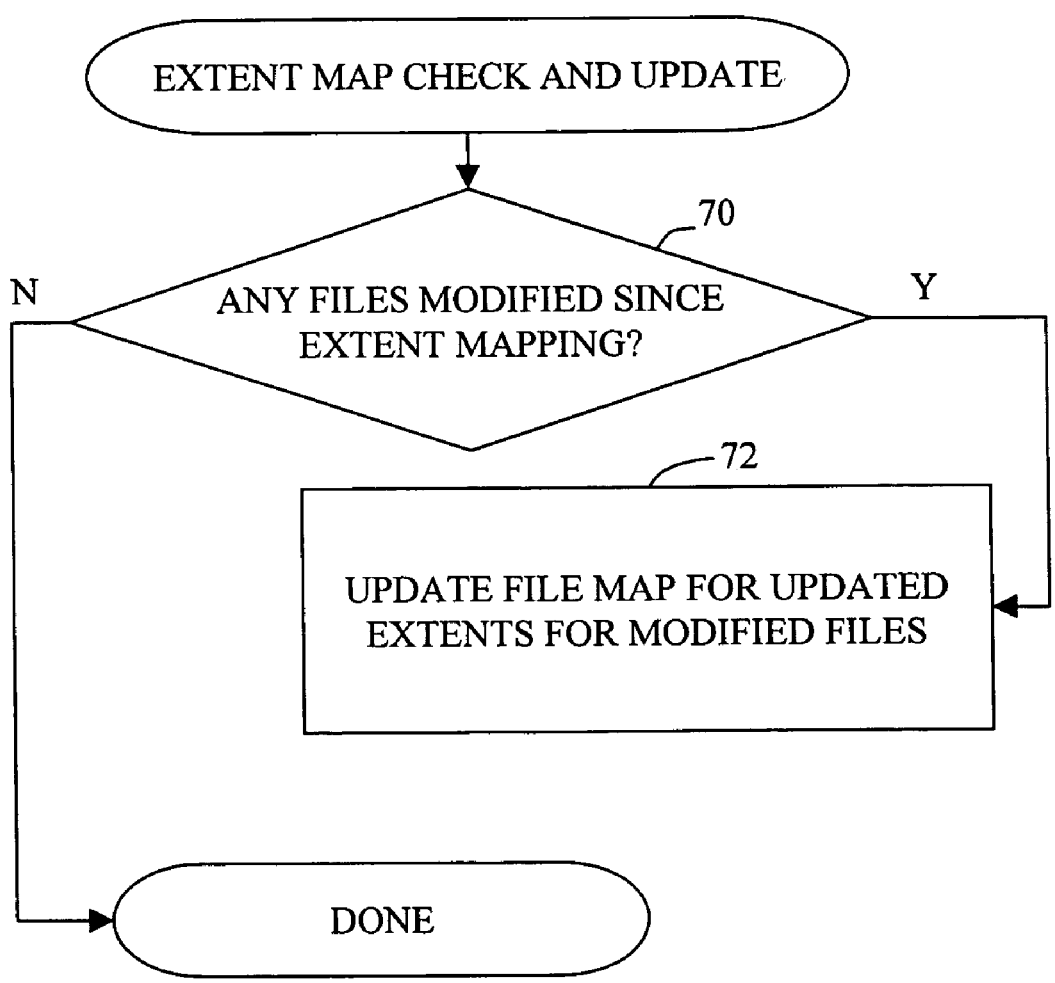
FIG. 7 is a flow chart of an extent mapping check and update process.

FIG. 7 is a flow chart of a process for performing an extent map and update. In a first act 70, a determination is made as to whether any files have been modified since the extent mapping was performed. This may be done, e.g., by checking if a given file's last edited time is later than the time of the extent mapping or by comparing a given file's last edited time (determined at the time of the extent map check) against its last edited time at the time of extent mapping.

Figure 5:
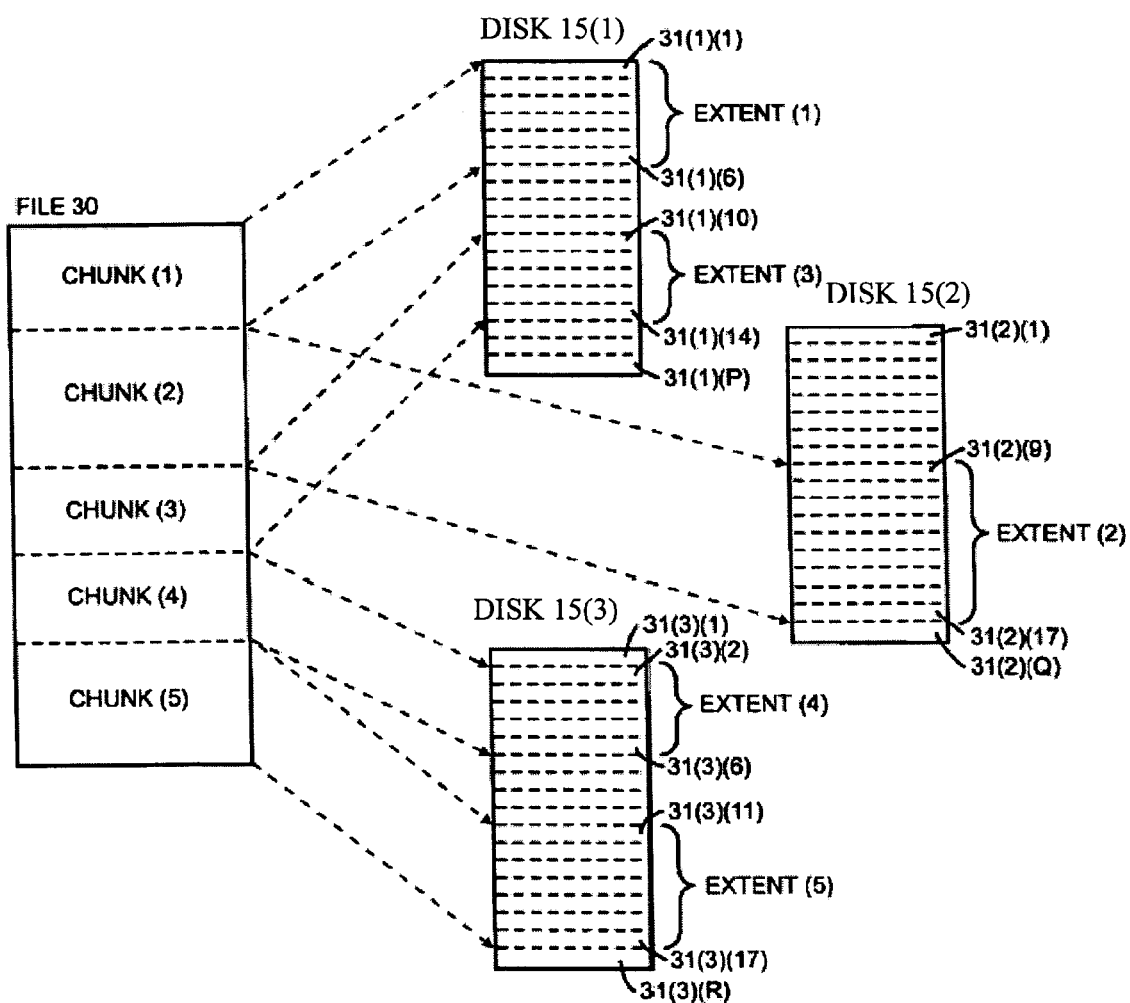
FIG. 5 illustrates schematically a file and portions of the file that are stored on three disk storage devices.

As shown in FIG. 5, a file may include several portions which are distributed among one or more disks and one or more series of blocks, which are referred to herein as "extents" on each disk. It would be helpful to describe the organization of data comprising a file stored on the primary disk (which may actually comprise more than one physical disk), which will be helpful in understanding the operating system-independent information which is stored in the file map (contained in the memory of the user system 18a, 18b) for a file. Generally, the disks that make up the one or more primary disks (or volumes) are organized into one or more "logical volumes" each of which may comprise at least portions of one or more disks. Each physical disk of the enterprise storage platform (that serves as part of a primary disk or as part of a mirror disk) stores data in a plurality of blocks, with a given disk storage device 15(1) storing data in blocks. Each block can generally accommodate a predetermined maximum amount of data. Blocks, in turn are aggregated into logical volumes. A logical volume may comprise several blocks from one disk storage device 15(1) and several blocks from another disk storage device 15(2). Logical volumes are established and managed by a logical volume manager portion (not shown) of the operating system controlling user system 18a, 18b (shown in FIGS. 1A and 1B).

A file, in turn, is stored in a logical volume. Files are established and managed by a file system manager portion (not shown) of the operating system of user system 18a, 18b. A file may include several portions which are distributed among one or more disks and one or more series of blocks, which are referred to herein as disk "extents" on each disk. This will be described in connection with FIG. 5.

FIG. 5 depicts illustrative details for a file 30 portions of which are stored on three disk storage devices 15(1), 15(2) and 15(3). Each disk storage device 15(s) comprises a series of blocks, with disk storage device 15(1) comprising a series of blocks 31(1)(1) through 31 (1)(P) (generally identified by reference numeral 31(1)(p)), disk storage device 15(2) comprising a series of blocks 31(2)(1) through 31(2)(Q) (generally identified by reference numeral 31(2)(q)) and disk storage device comprising a series of blocks 31(3)(1) through 31(3)(R) (generally identified by reference numeral 31(3)(r)). The storage devices 15(s) may have the same number of blocks (in which case "P," "Q," and "R" may be equal) or they may have different numbers of blocks (in which case "P," "Q" and "R" may, but need not be different). For the illustrative file 30:

(i) a first portion, identified in FIG. 5 as "Chunk (1)," is stored in a series of blocks on disk storage device 15(1) starting at block 31(1)(0) and extending through block 31(1)(6), which comprise an extent identified as "Extent (1)";

(ii) a second portion, identified as "Chunk (2)," is stored in a series of blocks on disk storage device 15(2) starting at block 31(2)(9) and extending through block 31(2)(17), which comprise an extent identified as "Extent (2)";

(iii) a third portion, identified as "Chunk (3)," is stored in a series of blocks on disk storage device 15(1) starting at block 31(1)(10) and extending through block 31(1)(14), which comprise an extent identified as "Extent (3)";

(iv) a fourth portion, identified as "Chunk (4)," is stored in a series of blocks on disk storage device 15(3) starting at block 31(3)(2) and extending through block 30(3)(6), which comprise an extent identified as "Extent (4)"; and (v) a fifth and final portion, identified "Chunk (5)," is stored in a series of blocks on disk storage device 15(3) starting at block 31(3)(11) and extending through block 31(3)(17), which comprise an extent identified as "Extent (5)."

Since a file such as file 30 will preferably be stored in a single logical volume, all of the extents Extent (1) through Extent (5) on the disk storage devices 15(1) through 15(3) will preferably comprise at least a portion of a single logical volume.

Each extent comprising file 30 is identified by an identifier or "extent descriptor," identifying the disk storage device 15(s) on which it is stored, the first block in the series of blocks comprising the extent and the number of successive blocks comprising the extent. Accordingly, Extent (1) is identified by, for example, an extent descriptor of the form <DISK15(1)_BLOCK31(1)(1)_6>, where "DISK15(1)" identifies the disk storage device, namely, disk storage device 15(1) on which the extent is stored, "BLOCK30(1)(1)" identifies the first block, namely, block 31(1)(1) in the extent, and "6" identifies the number of successive blocks 31(1)(p) comprising the extent. Similarly, (i) Extent (2) is identified by a descriptor of the form <DISK15(2)_BLOCK31(2)(9)_9>;
(ii) Extent (3) is identified by a descriptor of the form <DISK15(1)_BLOCK31(1)(10)_5>;
(iii) Extent (4) is identified by a descriptor of the form <DISK15(3)_BLOCK31(3)(2)_5>; and
(iv) Extent (5) is identified by a descriptor of the form <DISK15(3)_LOCK31(3)(1)_7>.

The list of extents on the respective disk storage device(s) 15(s) on which the data in file 30 is stored essentially defines the file in a manner that is independent of the particular operating system that is controlling the host computer 11 or the operating system controlling backup server 13.

Figure 6:
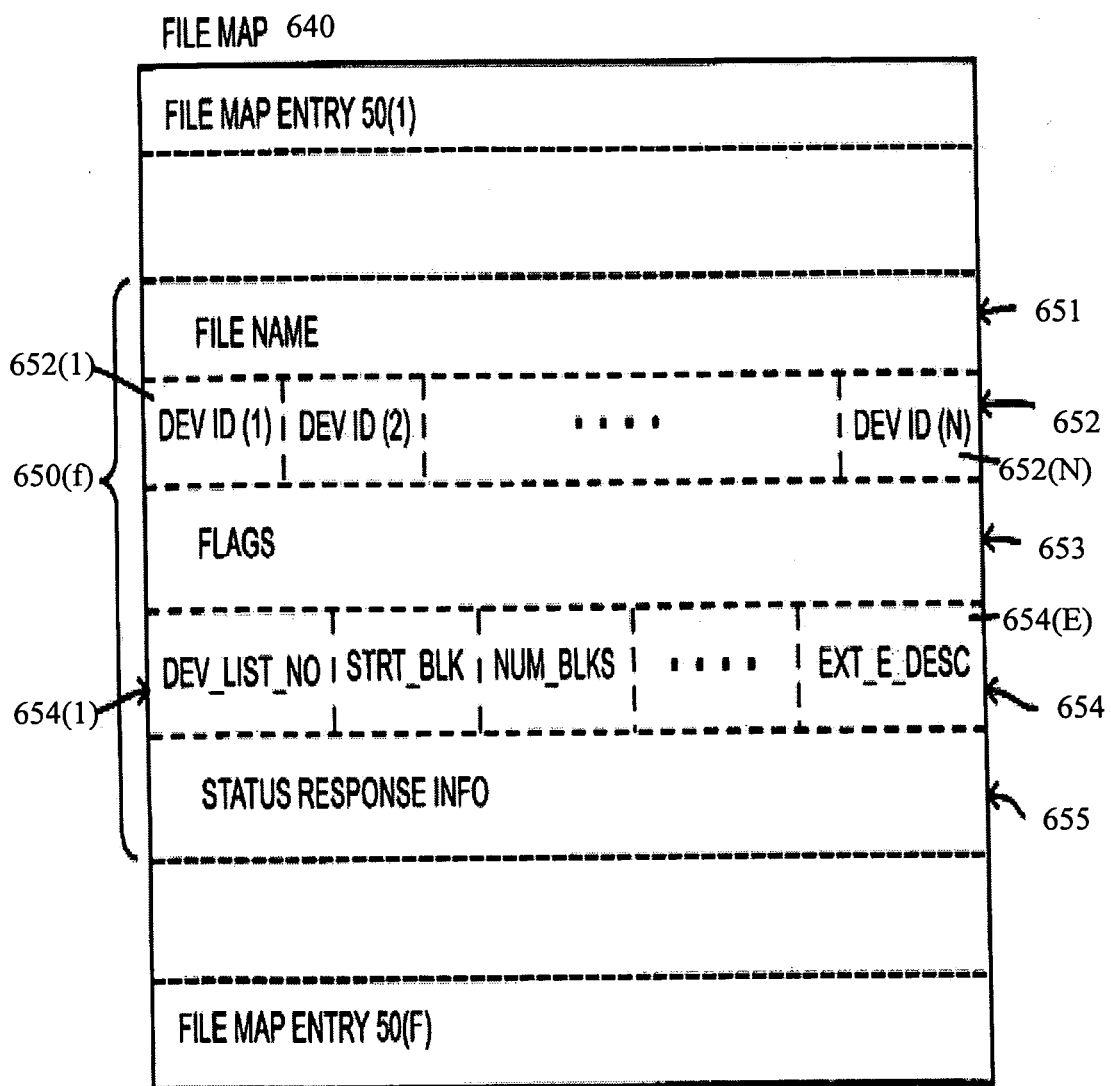
FIG. 6 is a schematic of an example file map generated by a file map generator (not shown) for a backup or restore operation.

With this background, a file map 640 that is generated by the file map generator for a backup or restore operation will be described in connection with FIG. 6. With reference to FIG. 6, the file map 640 includes one or more file map entries 650(1) through 650(F) (generally identified by reference numeral 650(f)), each of which is associated with one of the files to be backed up or restored during the backup or restore operation. Each entry 650(f) includes a number of fields, including a file name field 651, a disk storage device list 652, a flags field 653, an extent descriptor list 654 and a status response information list 655. The file name field 651 contains a file name that identifies the particular file with which the entry 650(f) is associated, which corresponds to the file name of one of the files to be backed up or restored during the backup or restore operation. The disk storage device list 652 of file map entry 650(f) contains one or more disk storage device identifier entries 652(1) through 651(N) (generally identified by reference numeral 651(n)), each of which identifies one of the disk storage devices 15(s) which contains at least one extent on which a portion of the file identified in file name field 651 is stored. Each disk storage device 15(s) which contains such an extent is identified in only one disk storage device identifier entry 652(n) in the disk storage device list 652 of the entry 650(f). Thus, for the illustrative file 30 described above in connection with FIG. 5, the disk storage device list 652 would have three disk storage device identifier entries 652(1) through 652(3), one for each of the disk storage devices 15(1), 15(2) and 15(3) on which extents associated with file 30 are stored.

The flags field 653 of entry 650(f) stores one or more flags which are useful in utilizing the entry 650(f); in one embodiment, the flags field 653 identifies, for example, the particular operating system for the host computer 11 which accesses the file identified in file name field 651.

The extent descriptor list 654 of the file map entry 650(f) comprises one or more extent descriptors 654(1) through 654(E) (generally identified by reference numeral 654(e)), each of which is associated with one of the extents on which the file is stored. If the extent descriptor list 654 contains a plurality of extent descriptors 654(e), the series of extent descriptors 654(1), 654(2), . . . 654(E) are in the order corresponding to the series of extents on which the file associated with file map entry 650(f) are stored. Each extent descriptor 654(e) comprises a plurality of fields, namely, a device list index field "DEV_LIST_IDX," a starting block identifier field "STRT_BLK" and a number of blocks field "NUM_BLKS." The device list index field stores an index into the disk storage device list 652 for the particular disk storage device identifier entry 652(n) whose contents identify the disk storage device 15(s) on which the extent associated with the descriptor is stored. The starting block identifier field identifies the starting block for the extent, and the number of blocks field identifies the number of blocks comprising the extent. Accordingly, for the illustrative file 30 described in connection with FIG. 5, if the disk storage device identifier entry 652(1) of disk storage device list 652 identifies disk storage device 15(1), disk storage device identifier entry 652(2) identifies disk storage device 15(2) and disk storage device identifier entry 652(3) identifies disk storage device 15(3), then the extent descriptors 654(e) of extent descriptor list 654 is of the form:

<1_BLOCK31(1)(1)_6>; extent descriptor 654(1)
<2_BLOCK31(2)(9)_9>; extent descriptor 654(2)
<1_BLOCK31(1)(10)_5>; extent descriptor 654(3)
<3_BLOCK31(3)(2)_5>; extent descriptor 654(4), and
<3_BLOCK31(3)(11)_7>; extent descriptor 654(5), with the initial "1," "2" and "3" in each extent descriptor comprising the index into the disk storage device list 652 for the particular entry 652(n) which contains the identification of the disk storage device 15(s) on which the disk extent associated with the extent descriptor 14(e) is stored. By providing a separate disk storage device list 652 identifying all of the disk storage devices 15(s) which contain disk extents on which the file is stored, with one disk storage device entry 652(n) per each such disk storage device 15(s), and using in each extent descriptor 654(e) the index into the list 652 to identify the disk storage device 15(s) instead of the actual identifier for the disk storage device 15(s), the file map entry 650(f) may be somewhat shorter than if the identifier for the respective disk storage device 15(s) is actually used in the extent descriptor 654(e), particularly if the data in the file is spread across a number of disk extents on a relatively few disk storage devices 15(s).

Finally, the status response information entry 655 of file map entry 650(f) contains predetermined response information useful in particular by the file map utilization module 43 in preparing responses to status requests requesting status for the file associated with file map entry 650(f) which may be generated by, for example, the control module 41.

The processing performed by, e.g., the data manager, the enterprise storage platform, the user system, and the database application, may be performed by individual or shared general purpose computers or in connection with specialized processing computers. Such processing may be performed by individual platforms or by distributed processing platforms. In addition, such processing and functionality can be implemented in the form of special purpose hardware or in the form of software being run by a general purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. An enterprise storage system for performing a file level backup operation on data using a mirror disk and a primary disk, individual files of data being backed up from the mirror disk to a backup storage media while a database application on a host system can freely read to and write from a database stored on the primary disk after a quiesce period which occurs as part of the file level backup operation, said system comprising:

a primary disk;

a mirror disk;

a file level mirrored backup portion, operable to initiate a file by file backup of data from said mirror disk to a backup storage device;

a synchronizer to synchronize data from said primary disk to said mirror disk upon an initiation of a file level mirrored backup process by said file level mirrored backup portion;

a database quiesce mechanism, operable after said synchronizer synchronizes said data from said primary disk to said mirror disk, to quiesce read and write interactions between said database application and said primary disk;

a discovery and prepare mechanism operable after quiescing of the read and write interactions to conduct discovery and prepare phases of a file by file mirrored backup operation;

a backup and cleanup mechanism to backup certain identified files from said mirror disk to said sequential storage media after completion of said discovery and prepare phases;

a split mechanism operable to split said mirror disk from said primary disk before backing data files up from said mirror disk to said sequential storage media;

an extent mapping mechanism to perform extent mapping on files to be backed up in a given backup session before said split mechanism splits said mirror for the same given backup session; and an extent map check and update mechanism to check, after said split mechanism splits said mirror for the same given backup session, whether any files have been updated in a manner so as to require additional or revised extent map information.

2. The system according to claim 1, wherein said backup storage device comprises sequential storage media.

3. The system according to claim 2, wherein said backup storage device comprises a tape storage device.

4. The system according to claim 3, wherein the quiescing of read and write interactions comprises freezing the database application.

5. The system according to claim 3, wherein the quiescing of read and write interactions comprises putting the database application in a hot backup state and maintaining a redo log during continued read and write interactions.

6. The system according to claim 1, wherein said extent mapping mechanism performs extent mapping before said database quiesce mechanism quiesces the read and write interactions for the same given backup session.

7. The system according to claim 1, said mirror disk comprising memory media contained within a same enterprise storage platform as said primary disk.

8. The system according to claim 1, further comprising an unquiesce mechanism to unquiesce the database application after said mirror is split for the same given backup session.

9. The system according to claim 8, wherein said unquiesce mechanism unquiesces the database application after said extent map check and update mechanism completes a check and update operation in the same given backup session.

10. The system according to claim 1, further comprising a backup and clean up mechanism operable to perform backup and cleanup processes for the same given backup session.

11. The system according to claim 10, wherein said backup and cleanup processes include writing given identified files to sequential storage in logical order in terms of a logical file identification scheme used by said host system.

* * * * *

UNITED STATES PATENT AND TRADEMARK OFFICE
CERTIFICATE OF CORRECTION

PATENT NO. : 6,934,725 B1
DATED : August 23, 2005
INVENTOR(S) : Thomas L. Dings

It is certified that error appears in the above-identified patent and that said Letters Patent is hereby corrected as shown below:

Column 2,
Line 56, delete "to mirror disk" and replace with -- to the mirror disk --.

Column 5,
Line 31, delete "platform 16a, 16b." and replace -- platforms 16a, 16b. --.
Line 32, delete "system 18a, 18b" and replace with -- systems 18a, 18b --.
Line 59, delete "the require less" and replace with -- they require less --.

Column 6,
Line 4, delete "such a backup" and replace with -- such as a backup --.

Column 8,
Line 61, delete "identified "chunk(5)," and replace with -- identified as "chunk(5) --.

Column 9,
Line 23, delete "<DISK15(3)_LOCK31(3)(1)_7>." and replace with
-- <DISK15(3)_BLOCK31(3)(1)_7>. --.
Line 34, delete "650(f)" and replace with -- 650(f)), --.

Signed and Sealed this

Thirty-first Day of January, 2006

JON W. DUDAS
*Director of the United States Patent and Trademark Office*